United States Patent [19]

Smiley

[11] 4,079,756
[45] Mar. 21, 1978

[54] PROTECTIVE CLOSURE FOR EXTERNAL PIPE THREADS

[75] Inventor: Kenneth A. Smiley, Eldred, Pa.

[73] Assignee: Pennsylvania Plastic Products, Inc., Eldred, Pa.

[21] Appl. No.: 694,536

[22] Filed: Jun. 10, 1976

[51] Int. Cl.² ............................................. B65D 59/06
[52] U.S. Cl. .................................. 138/96 T; 215/275; 215/329; 220/320; 285/DIG. 2
[58] Field of Search ............... 138/96 T; 285/DIG. 2; 215/274, 275, 329; 220/288, 319, 320

[56] References Cited

U.S. PATENT DOCUMENTS

| | | | |
|---|---|---|---|
| 1,349,789 | 8/1920 | Schirra | 138/96 T |
| 1,906,182 | 4/1933 | Riney | 138/96 T |
| 2,039,757 | 5/1936 | Von Till | 215/329 |
| 2,121,436 | 6/1938 | Lytle | 138/96 T |
| 2,312,513 | 3/1943 | Wilson | 215/329 |
| 2,989,087 | 6/1961 | Higgins | 138/96 T |

Primary Examiner—Charles E. Phillips
Attorney, Agent, or Firm—Cumpston & Shaw

[57] ABSTRACT

A plastic closure securely mounted on the external threads at the end of a pipe, tubing, casing, or the like for protecting the external threads from damage. The closure comprises a tapered sleeve which is normally uncompressed and compressed by tightening a metal strap enclosing the sleeve for securing it to the pipe end. When the closure is mounted on the pipe end in its compressed condition, threads on the inner peripheral surface of the sleeve are urged into engagement with the external pipe threads for tightly securing the closure to the pipe end. The sleeve has a conical seat for the strap in its normal uncompressed condition, and in the compressed condition of the sleeve the seat is cylindrical relative to the axis of the sleeve. The sleeve has a flat surface on which the strap seal is placed and a slot for receiving a projection on the strap to prevent circumferential movement of the strap before and during tightening.

11 Claims, 6 Drawing Figures

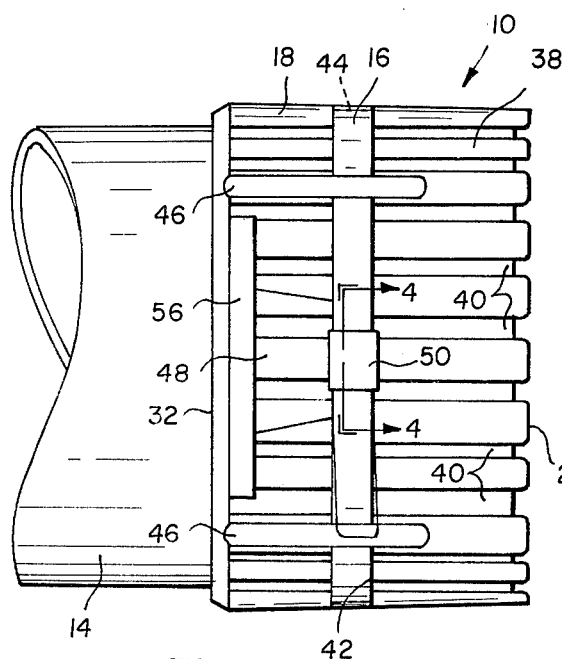
FIG. 1
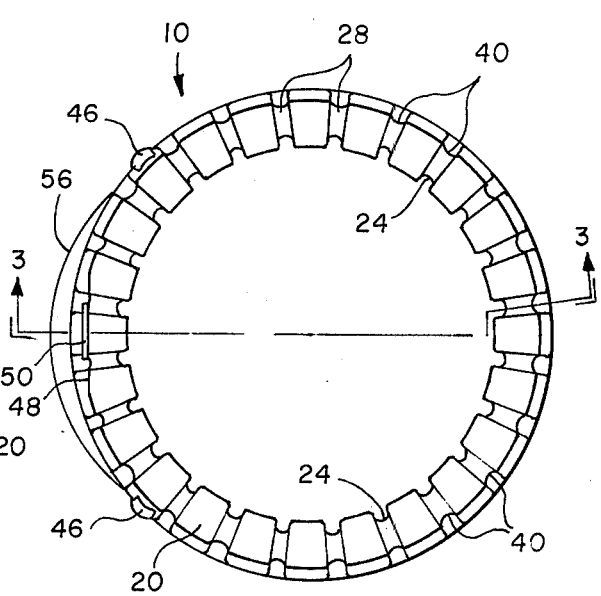
FIG. 2
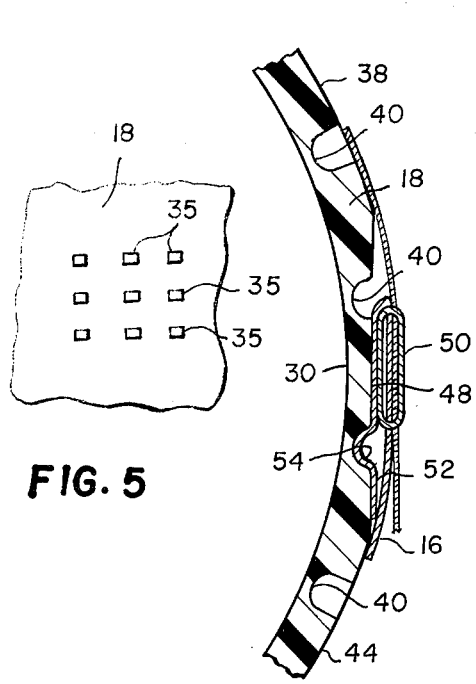
FIG. 5
FIG. 4
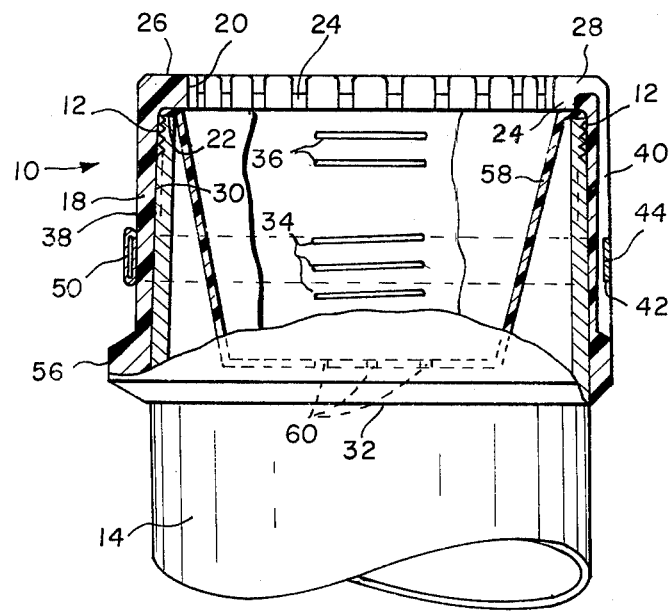
FIG. 3

PROTECTIVE CLOSURE FOR EXTERNAL PIPE THREADS

BACKGROUND OF THE INVENTION

1. Field of the Invention

This invention relates generally to closures, and more specifically to an improved closure for protecting the external threads at the end of a pipe or the like.

2. Description of the Prior Art

It is known in the prior art to provide a plastic closure for protecting the external threads at the end of a pipe. The closure comprises a generally tapered sleeve which in its normal uncompressed condition is mounted over the threads on the pipe. The sleeve is compressed by tightening a metal strap enclosing the sleeve for urging straight threads on its inner peripheral surface into engagement with the external pipe threads for tightly securing the closure to the pipe end. One disadvantage of this prior art closure is that it does not readily permit screwing or unscrewing the closure from the external threads when the closure is in its compressed condition. Another disadvantage is that the peripheral strap seat is conical relative to the axis of the sleeve when the sleeve is compressed. This results in an uneven distribution of the radially inwardly directed forces on the seat when the strap is tightened and also in possible damage to the seal on the strap. Another disadvantage of such closure is that the strap seal rests on a curved surface resulting in a curved and weakened seal when the strap is tightened. Still another disadvantage of such closure is that no means are provided for preventing circumferential movement of the strap before it is tightened.

It is also known in the art to provide a two-piece plastic closure comprising a split sleeve having threads on its inner peripheral surface. The split sleeve is placed on the pipe threads and a single sleeve is forced over the split sleeve to secure it to the pipe. A disadvantage of this closure is that the single sleeve is prone to slip off the split sleeve due to expansion and/or impact with or by foreign objects.

It is further known to provide metal closures having inner peripheral threads for threadedly engaging the external pipe threads. However, such metal closures suffer from the disadvantage that upon threading the closure onto the pipe end, cross threading may occur. Such cross threading may damage the external threads necessitating retapping or cutting off the damaged end and rethreading it. Another disadvantage of the metal closure is that rusting and corrosion may occur at the interface of the closure and pipe, or the parts will freeze together in winter necessitating the services of a welder to remove the rusted on or frozen closure.

SUMMARY OF THE INVENTION

In accordance with a preferred embodiment of the invention, an improved plastic closure is disclosed for protecting the external threads at the end of a pipe. The closure comprises a generally tapered sleeve which is mounted over the threads on the pipe end. The sleeve is normally uncompressed and is compressed by tightening a metal strap enclosing the sleeve. In its compressed condition, circumferentially spaced groups of straight and helical threads on the inner peripheral surface of the sleeve are urged into engagement with the external pipe threads for tightly securing the closure to the pipe end and permitting screwing the closure onto and off of the pipe. The sleeve has a conical seat for the strap in its normal uncompressed condition, and when compressed the seat is cylindrical relative to the axis of the sleeve. The sleeve has a flat surface on which the strap seal is placed and a slot for receiving a projection on the strap to prevent circumferential movement of the strap before it is tightened. The sleeve further has a rim at one end with slots to provide moisture drainage and means for turning the closure, and a rib at its opposite end in alignment with the flat surface for protecting the seal. One advantage of this improved plastic closure is its ability to be screwed on and off the closure in its compressed condition. Another advantage is to evenly distribute the radially inwardly directed forces on the sleeve seat when the strap is tightened. This results in more securely attaching the closure to the pipe end and minimizing damage to the strap seal. Another advantage is to position the strap seal on a flat surface to minimize damage thereto when the strap is tightened. Still another advantage is to prevent circumferential movement of the strap before it is tightened. The invention and these and other advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which:

FIG. 1 is a side elevational view of a preferred embodiment of the closure of this invention installed on the end of a pipe;

FIG. 2 is an end view of the closure of FIG. 1;

FIG. 3 is a section view taken substantially along line 3—3 of FIG. 2;

FIG. 4 is a section view taken substantially along line 4—4 of FIG. 1;

FIG. 5 is a segmental view of a portion of the sleeve showing another embodiment of the helical thread portion.

DESCRIPTION OF THE PREFERRED EMBODIMENT

Figure 6:
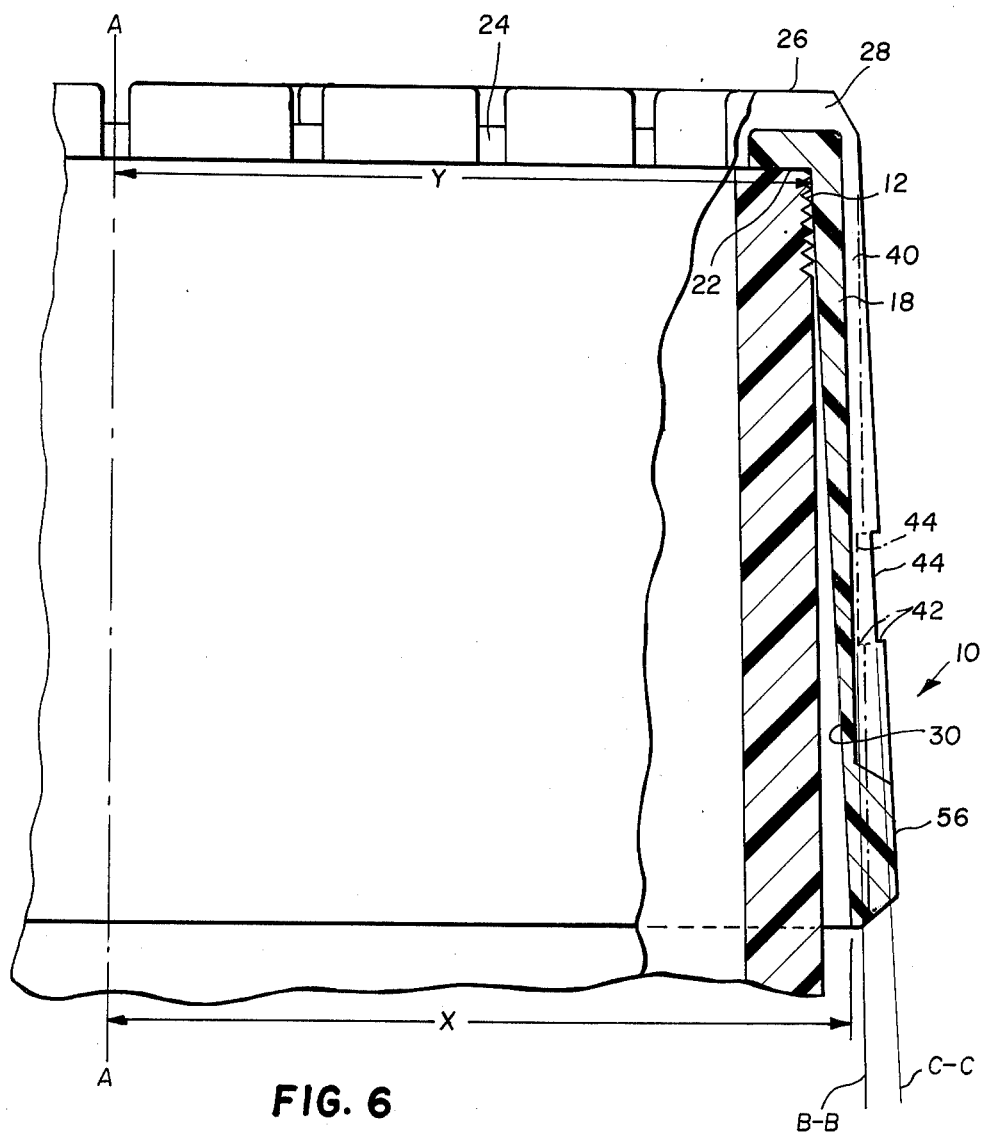
FIG. 6 is a segmental view similar to FIG. 3 in enlarged or exaggerated form with parts omitted for clarity.

With reference to FIGS. 1-4, a preferred embodiment of a cup-shaped closure 10 preferably made of any suitable high-impact plastic for protecting the external threads 12 (FIG. 3) on a pipe end 14 is disclosed. The closure 10 is mormally uncompressed and compressed by a strap 16 to be described in greater detail hereinafter for securing the closure to pipe 14. The closure 10 is preferably placed on pipe end 14 in its uncompressed condition and then compressed to secure it to the pipe end. However, the closure 10 can also be secured to the pipe end 14 by pounding it onto the pipe with the closure in its compressed condition. Such pounding does not damage the metal or plastic threads and the closure securely grips the external threads due to the resiliency and memory of the plastic.

More specifically, closure 10 comprises a normally uncompressed, endless conical or tapered sleeve 18 having a radially depending peripheral rim 20 at one end. The rim 20 has an inner face 22 (FIG. 3) for engaging the end of pipe 14 when the closure 10 is mounted thereon. The thickness of rim 20 is preferably greater than the wall thickness of pipe end 14 to fully protect the pipe end. The rim 20 is further provided with radially extending, angularly spaced slots 24 at its inner periphery for allowing any moisture collected in pipe 14 to drain out of the pipe. In addition, rim 20 has on its outer face 26 a plurality of diametrically opposed, radially extending slots 28 in alignment with slots 24 for receiving any suitable bar by which the closure may be screwed or unscrewed from pipe end 14 when in its compressed condition. The inner peripheral surface 30 of sleeve 18 is provided substantially intermediate inner face 22 of rim 20 and the opposite end 32 of closure 10 with a plurality of interrupted or circumferentially spaced groups of helical thread segments 34 (FIG. 3). It should be understood that the term thread segments 34 is broad enough to encompass other means to achieve threading such as groups of spaced studs 35 (FIG. 5) adapted to enter and follow threads on the pipe as the closure is screwed or unscrewed from the pipe. When closure 10 is mounted on external threads 12 in its compressed condition, helical threads 34 are forced into threaded engagement with external threads 12 on pipe 14. The angle or inclination of helical threads 34 relative to a plane surface perpendicular to the axis of closure 10 is selected intermediate the smallest and largest angles of helical threads known in the industry. Accordingly, helical threads 34 will mate or threadedly engage external threads 12 of varied pitch and design. For the purpose of this invention, two or three helical threads 34 in each thread group have been found to be sufficient to achieve the desired holding force and threading capability. The inner periphery 30 of sleeve 18 is further provided with a plurality of interrupted or circumferentially spaced groups of straight threads 36 (FIG. 3), preferably interposed between inner face 22 of rim 20 and the helical threads 34. The straight threads 36 are slightly smaller than helical threads 34 and are designed to cross thread the external pipe threads 12 to provide an additional means for holding or securing closure 10 to the end of pipe 14. The outer periphery 38 of sleeve 18 is provided with a plurality of axially extending, circumferentially spaced slots 40 in alignment with end and drain slots 24, 28 respectively to make sleeve 18 more flexible and compressible, and to permit screwing and unscrewing of closure 10 by means of a spanner tool. The outer surface 38 is further provided with a peripheral groove 42 (FIGS. 1, 3 and 6) substantially intermediate the ends of closure 10 and preferably in alignment with helical threads 34 for receiving a tightening member such as the aforementioned strap 16 of a metal type referred to in the industry as a Signode (trademark) strap. Such strap is smooth and flat in cross section and as is well known is substantially nonexpandable when subjected to normal temperature and tensile forces used in the thread protector closure art. In addition to compressing sleeve 18, strap 16 controls the expansion of the plastic sleeve relative to the pipe. At high temperatures, the plastic expands more than steel and the strap limits the expansion of the plastic to only a little more than the steel. This prevents the closure from losing its tight grip on the pipe. The groove 42 defines a peripheral conical or frustoconical seat 44 (FIG. 6) relative to the axis A—A of closure 10 when in its uncompressed condition, and a peripheral cylindrical seat 44 (FIG. 6) relative to the axis of the closure when in its compressed condition. In the conical and cylindrical orientations of the closure sleeve, reference lines C—C and B—B along seat 44 are at an angle and parallel respectively to axis A-A. Accordingly, when strap 16 is subjected to a tensile force of substantially 80 pounds (preferably after closure 10 is placed on the end of a pipe 14 with inner face 22 of rim 20 engaging the end surface of pipe 14) the tensioned strap 16 exerts an equal force radially inwardly on the entire seat surface 44 of groove 42. Such action compresses sleeve 18 and causes internal threads 34, 36 to securely grip the external pipe threads 12. To prevent strap 16 from laterally moving and falling off closure 10 prior to tightening, the outer surface 38 is further provided with a pair of fingers 46 (FIG. 1) having one end integral with sleeve 10. The opposite end of fingers 46 are free to permit strap 16 to be mounted on closure 10, the free ends then being sealed to outer surface 38 by any suitable sealing means for capturing strap 16 in groove 42. The outer surface 38 is further provided with a flat surface 48 in register with seal 50 of strap 16. This causes seal 50 to remain flat while strap 16 is tightened resulting in a stronger seal. The strap end 52 (FIG. 4) beneath seal 50 is provided with a curved portion forming a projection or nipple 54 projecting into one of the axially extending slots 40 for retaining strap 16 in the proper position for tightening. The nipple 54 prevents circumferential movement of strap 16, particularly during the strap tightening operation when closure 10 is secured onto the end of pipe 14. The outer surface 38 of sleeve 18 is further provided at one end with a raised arcuate rib 56 (FIG. 2) in alignment with flat surface 48 to protect seal 50 from damage from external objects striking the closure such as other pipes. If it is desired to close off the opening in pipe end 14 in order to prevent dirt or the like from entering, a cup-shaped insert 58 (FIG. 3) is provided having an annular lip that is interposed between the end of pipe 14 and the inner face 22 of rim 20. The insert 58 is preferably provided with one or more small openings 60 in its closed end to provide proper ventilation of the pipe opening or cavity so that formation of moisture within pipe 14 is minimized.

The invention has been described in detail with particular reference to a preferred embodiment, but it will be understood that variations and modifications can be effected within the spirit and scope of the invention as described.

What is claimed is:

1. A plastic closure for protecting the external threads at the end of a pipe comprising:

a cup-shaped hollow tapered endless sleeve having a normal uncompressed condition, said sleeve having one end of one inner diameter slightly larger than the corresponding outer diameter of said external threads at said one end, and an opposite end of a larger inner diameter than said one inner diameter and slightly larger than the corresponding outer diameter of said external threads at said opposite end;

a depending rim at said one end of said sleeve for engaging the end of the pipe, said sleeve having an inner periphery loosely spaced from said external pipe threads when said sleeve is mounted thereon in its uncompressed condition;

a helical thread portion on said inner periphery of said sleeve to permit screwing and unscrewing the closure from the pipe when said sleeve is moved from said uncompressed condition to a compressed condition; and substantially non-expandable means encircling the outer periphery of said sleeve for compressing said sleeve to said compressed condition when subjected to tension whereby said helical thread portion is forced and retained in threaded engagement with said external pipe threads when said closure is secured to said external threads on the pipe end.

2. The closure of claim 1 wherein said compressing means comprises a strap, said sleeve has an outer peripheral groove for receiving said strap, and said groove defines a conical seat for said strap relative to the axis of said sleeve when said sleeve is in its normal uncompressed condition, and a cylindrical seat for said strap relative to the axis of said sleeve when said sleeve is in its compressed condition whereby the forces generated by said strap are directed evenly against said seat.

3. The closure of claim 2 wherein said strap has a seal, and said sleeve has an outer flat surface for receiving said seal.

4. The closure of claim 2 wherein said sleeve has an outer slot, said strap has a seal and an end portion extending beneath said seal substantially concentric to said strap, and said end portion has a depending projection extending into said slot for preventing circumferential movement of said strap as it compresses said sleeve.

5. A plastic closure for protecting the external threads at the end of a pipe comprising:
a cup-shaped hollow tapered endless sleeve having a normal uncompressed condition, said sleeve having one end of one inner diameter slightly larger than the corresponding outer diameter of said external threads at said one end, and an opposite end of a larger inner diameter than said one inner diameter and slightly larger than the corresponding outer diameter of said external threads at said opposite end;
a depending rim at said one end of said sleeve for engaging the end of the pipe, said sleeve having an inner periphery loosely spaced from said external pipe threads when said sleeve is mounted thereon in its uncompressed condition;
a first helical thread portion on said inner periphery of said sleeve to permit screwing and unscrewing the closure from the pipe when said sleeve is moved from said uncompressed condition to a compressed condition;
a second straight thread portion on the inner periphery of said sleeve interposed between said rim and said first helical thread portion for holding the closure from axial movement when mounted on the pipe and said sleeve is moved from said uncompressed condition to said compressed condition;
substantially non-expandable means encircling the outer periphery of said sleeve for compressing said sleeve to said compressed condition when subjected to tension whereby said first helical portion is forced and retained in threaded engagement with said external pipe threads and said second thread portion is in cross-threading engagement with said external pipe threads when said closure is secured to said external threads on the pipe end.

6. The closure of claim 5 wherein said compressing means comprises a strap, said sleeve has an outer peripheral groove for receiving said strap, and said groove defines a conical seat for said strap relative to the axis of said sleeve when said sleeve is in its normal uncompressed condition, and a cylindrical seat for said strap relative to the axis of said sleeve when said sleeve is in its compressed condition whereby the forces generated by said strap are directed evenly against said seat.

7. The closure of claim 6 wherein said strap has a seal, and said sleeve has an outer flat surface for receiving said seal.

8. The closure of claim 6 wherein said sleeve has an outer slot, said strap has a seal and an end portion extending beneath said seal substantially concentric to said strap, and said end portion has a depending projection extending into said slot for preventing circumferential movement of said strap as it compresses said sleeve.

9. A plastic closure for protecting the external threads at the end of a pipe comprising:
a hollow tapered sleeve in a normal uncompressed condition, said sleeve having one end and an opposite end;
a depending rim at said one end of said sleeve having an outer face and an inner face for engaging the end of the pipe when the closure is mounted thereon;
first radially extending and circumferentially spaced drainage slots on the inner periphery of said rim;
second radially extending and angularly spaced slots on said outer face of said rim by which the closure may be screwed or unscrewed from the external threads on the pipe end;
third axially extending and circumferentially spaced slots on the outer periphery of said sleeve, said first, second, and third slots all being in alignment with one another;
a first thread portion on the inner periphery of said sleeve;
a second thread portion on the inner periphery of said sleeve axially spaced from said first thread portion;
said sleeve having an outer flat surface and a peripheral groove extending through said flat surface and defining a conical seat relative to the axis of said sleeve when said sleeve is in its normal uncompressed condition; and
a strap encircling said sleeve and seated in said groove for compressing said sleeve to a compressed condition in which said groove defines a cylindrical seat relative to the axis of said sleeve, said strap having a seal placed on said flat surface and an end portion extending beneath said seal and concentric to said strap, said end portion having a depending projection extending into one of said third slots for preventing circumferential movement of said strap as it compresses said sleeve whereby said first thread portion threadingly engages the external pipe threads and said second thread portion cross-threads the external pipe threads when said sleeve is secured to the external threads on the pipe end.

10. The closure of claim 9 wherein said first thread portion is helical and said second thread portion is straight, and said second straight thread portion is interposed between said outer face of said rim and said first helical thread portion.

11. The closure of claim 10 wherein said sleeve is further provided at said opposite end with a projecting rib on its outer periphery in alignment with said flat surface for protecting said seal.

* * * * *